(12) United States Patent
Suzuki

(10) Patent No.: US 11,487,189 B2
(45) Date of Patent: Nov. 1, 2022

(54) HIGH-PLACE OBSERVATION DEVICE INCLUDING A GAS BALLOON AND A DETACHABLE ROTORCRAFT

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 375 days.

(21) Appl. No.: 16/630,426

(22) PCT Filed: Jul. 12, 2017

(86) PCT No.: PCT/JP2017/025346
§ 371 (c)(1),
(2) Date: Jan. 10, 2020

(87) PCT Pub. No.: WO2019/012614
PCT Pub. Date: Jan. 17, 2019

(65) Prior Publication Data
US 2021/0149279 A1   May 20, 2021

(51) Int. Cl.
| | | |
|---|---|---|
| *B64B 1/44* | (2006.01) | |
| *B64B 1/54* | (2006.01) | |
| *B64C 27/00* | (2006.01) | |
| *B64D 47/08* | (2006.01) | |
| *B64F 3/00* | (2006.01) | |
| *G03B 15/00* | (2021.01) | |
| *G03B 17/56* | (2021.01) | |

(52) U.S. Cl.
CPC ............. *G03B 17/561* (2013.01); *B64B 1/44* (2013.01); *B64B 1/54* (2013.01); *B64C 27/00* (2013.01); *B64D 47/08* (2013.01); *B64F 3/00* (2013.01); *G03B 15/006* (2013.01)

(58) Field of Classification Search
CPC .... G03B 15/00; G03B 15/006; G03B 17/561; B64B 1/44; B64B 1/50; B64B 1/54; B64C 27/08; B64C 39/022; B64D 47/08
USPC ........................................................ 244/114 R
See application file for complete search history.

(56) References Cited

U.S. PATENT DOCUMENTS

2006/0202088 A1* 9/2006 Padan ...................... B64D 1/00
244/137.1
2020/0218287 A1* 7/2020 Wang .................... B64C 39/022

FOREIGN PATENT DOCUMENTS

| CN | 112005942 A | * 12/2020 |
| JP | 2013079034 A | 5/2013 |
| JP | 2013181821 A | 9/2013 |

(Continued)

OTHER PUBLICATIONS

Search Report dated Oct. 17, 2017 for PCT Application No. PCT/JP2017/025346.

(Continued)

*Primary Examiner* — Brady W Frazier

(57) ABSTRACT

A high-place observation device for stably performing a fixed-point observation of a target object from a high place is provided. The high-place observation device provides a long pole which is formed to extend and contract freely and which stands on the installation surface, a rotorcraft for positioning the pole to a desirable height position by extending and contracting the pole by a floating force in a connected state, a winding mechanism which fixes and maintains the height position of the pole to the height position set by the rotorcraft, and a camera attached to the rotorcraft.

5 Claims, 8 Drawing Sheets

(56) References Cited

FOREIGN PATENT DOCUMENTS

| | | |
|---|---|---|
| JP | 2016037246 A | 3/2016 |
| JP | 2016210229 A | 12/2016 |
| JP | 2017040846 A | 2/2017 |
| JP | 2017071379 A | 4/2017 |
| WO | WO2012094430 A2 | 7/2012 |
| WO | WO2013052178 A2 | 4/2013 |
| WO | WO2016121008 A1 | 8/2016 |
| WO | WO2017117608 A1 | 7/2017 |

OTHER PUBLICATIONS

European Search Report and Opinion dated Feb. 5, 2021 for related European Patent Application No. EP 17917499.

* cited by examiner

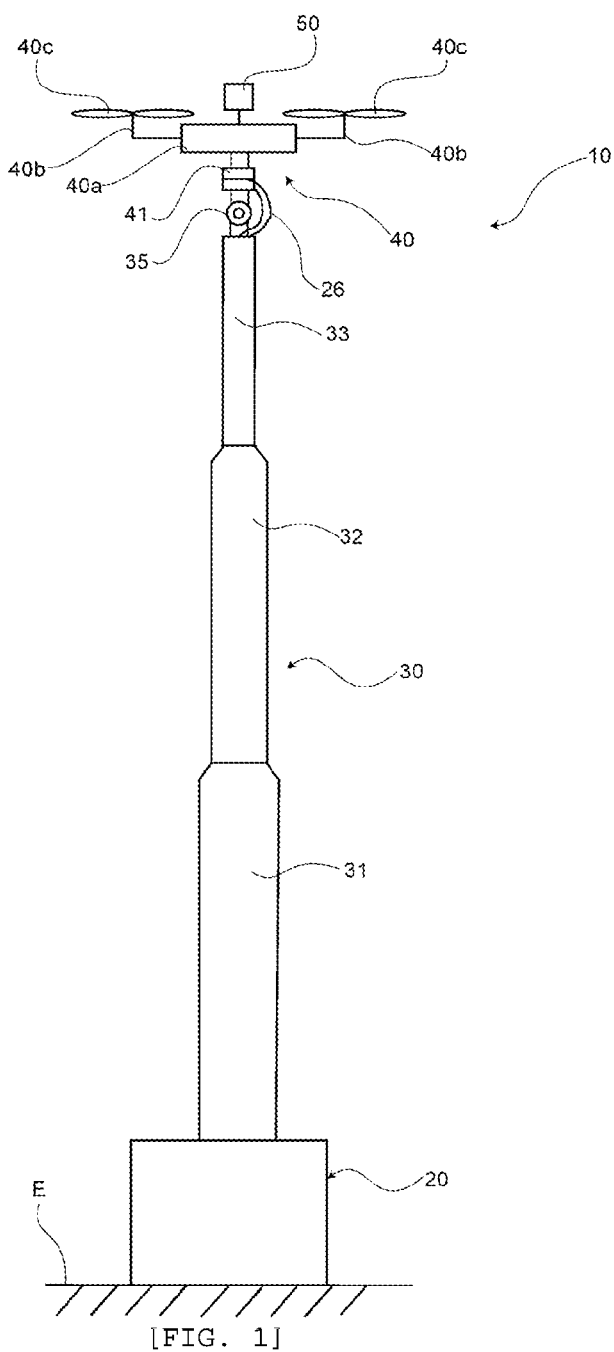
[FIG. 1]

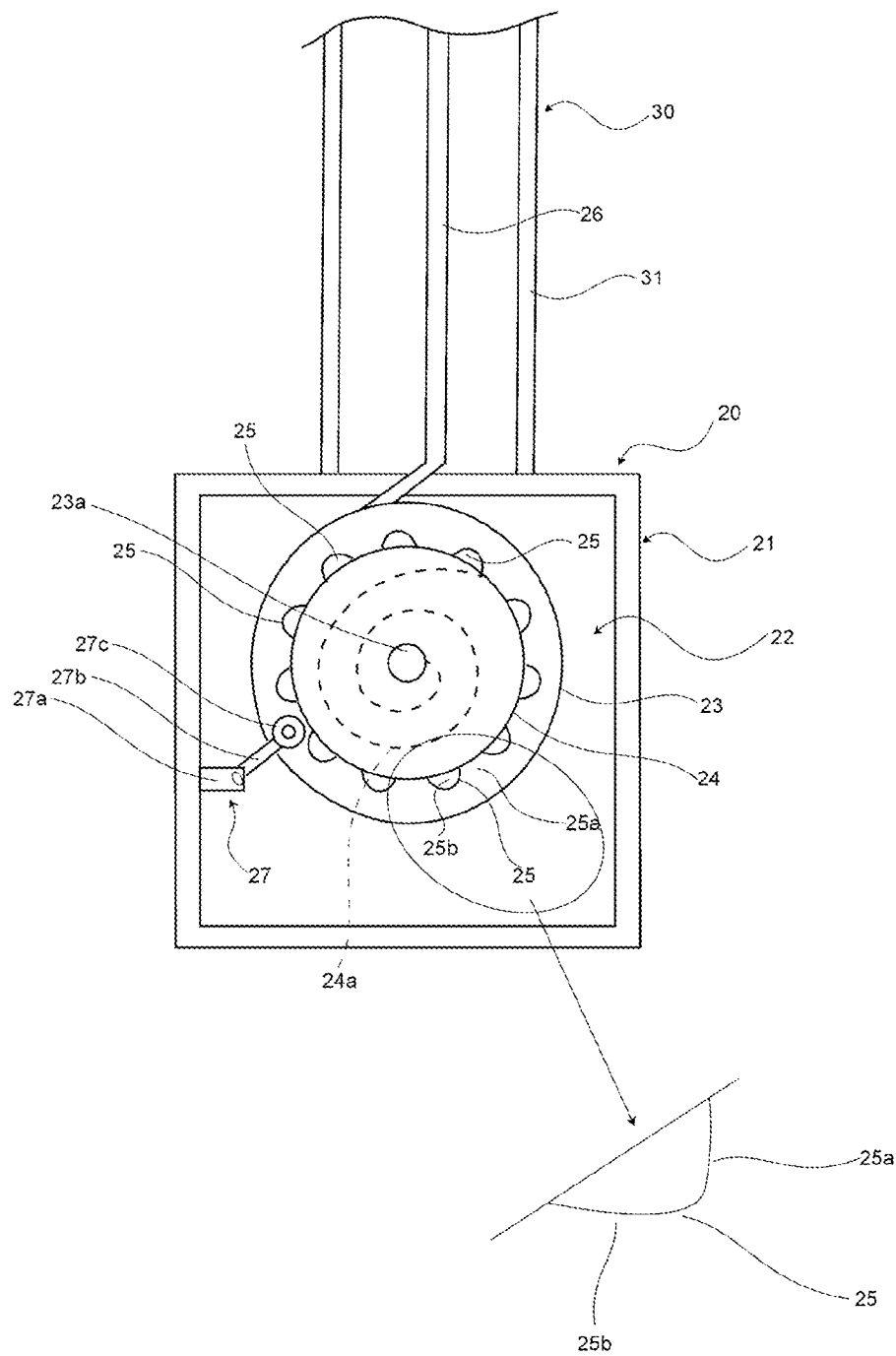
[FIG. 2]

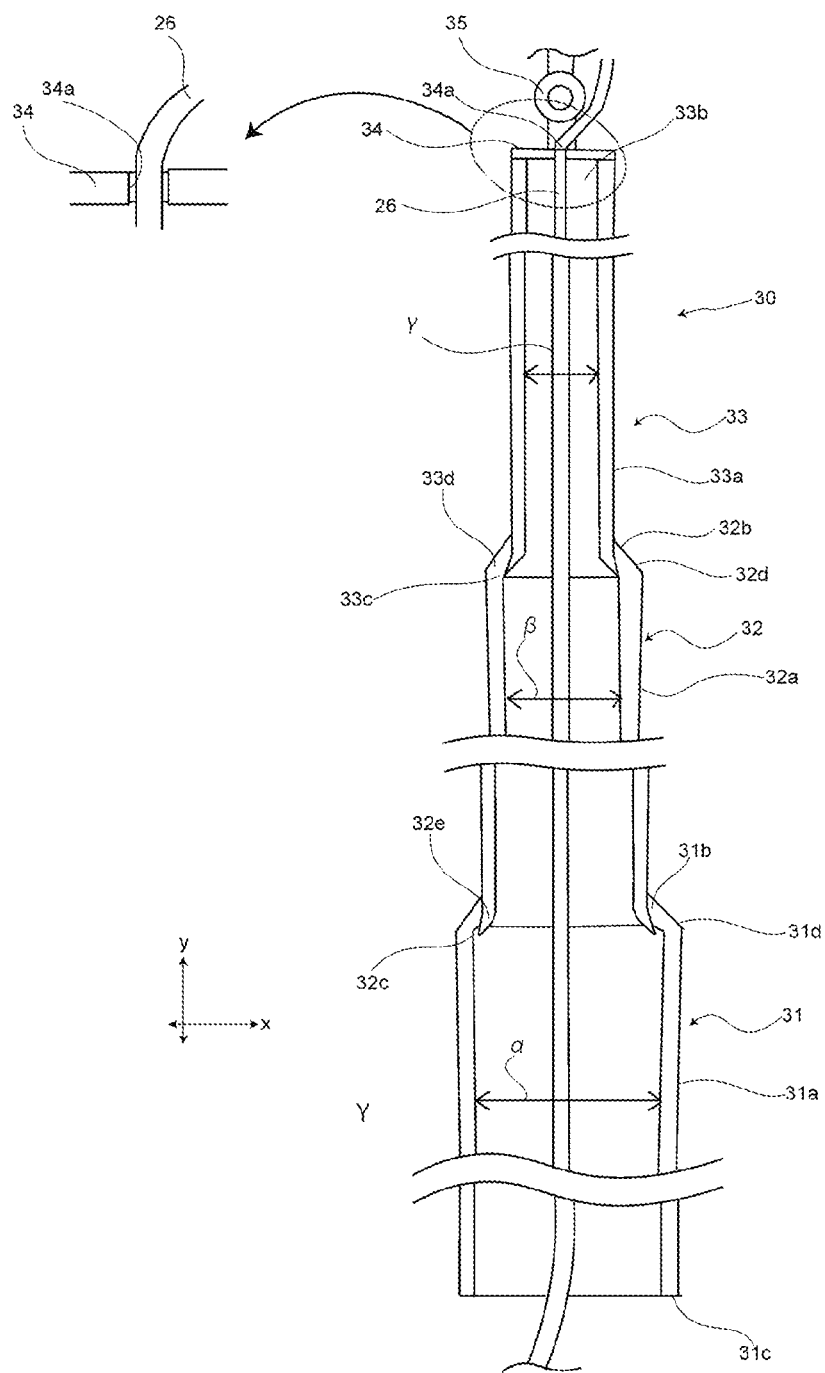
[FIG. 3]

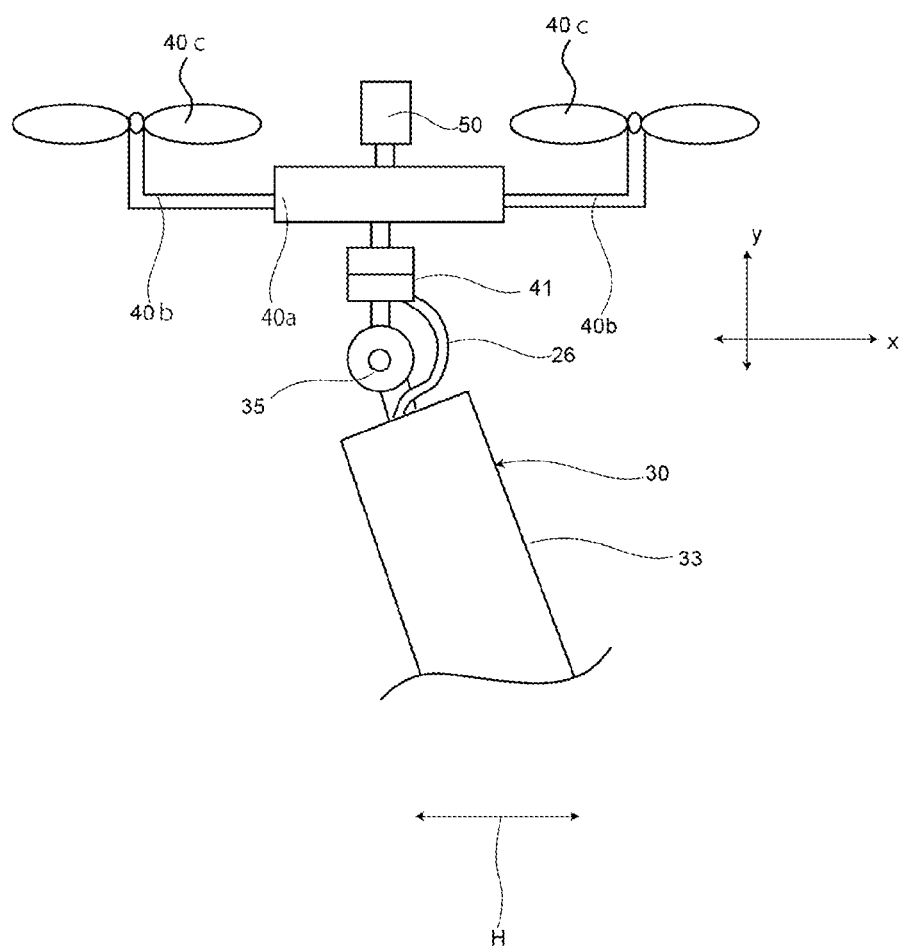
[FIG. 5]

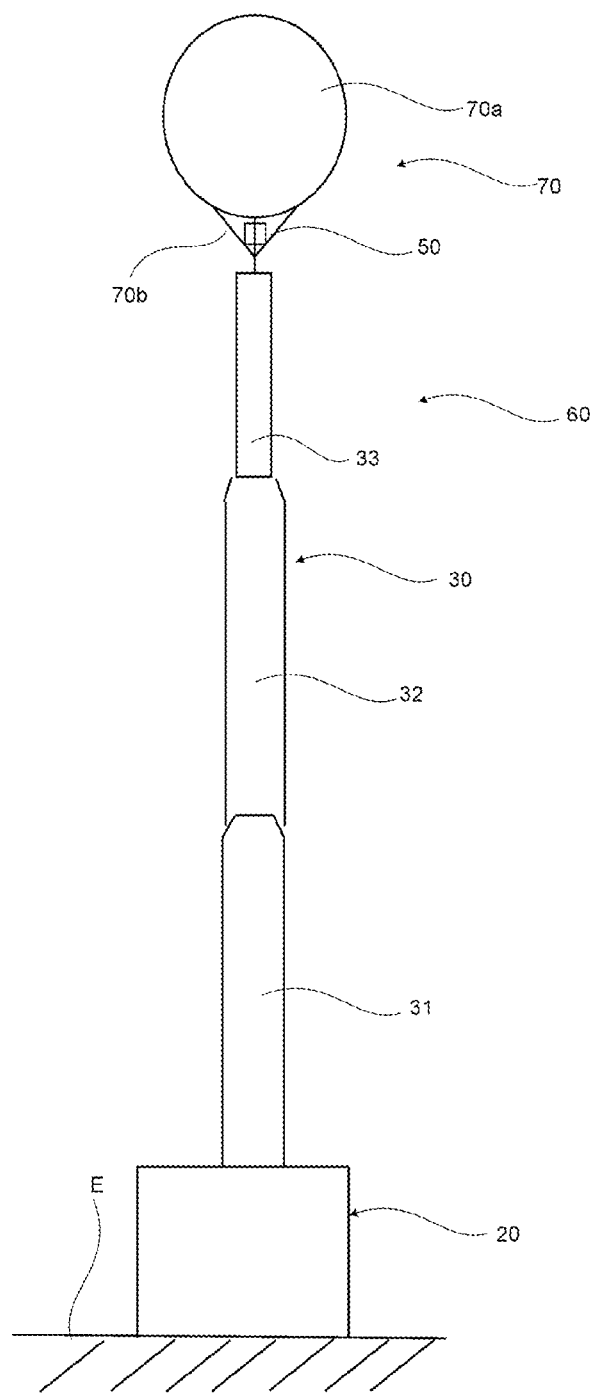
[FIG. 7]

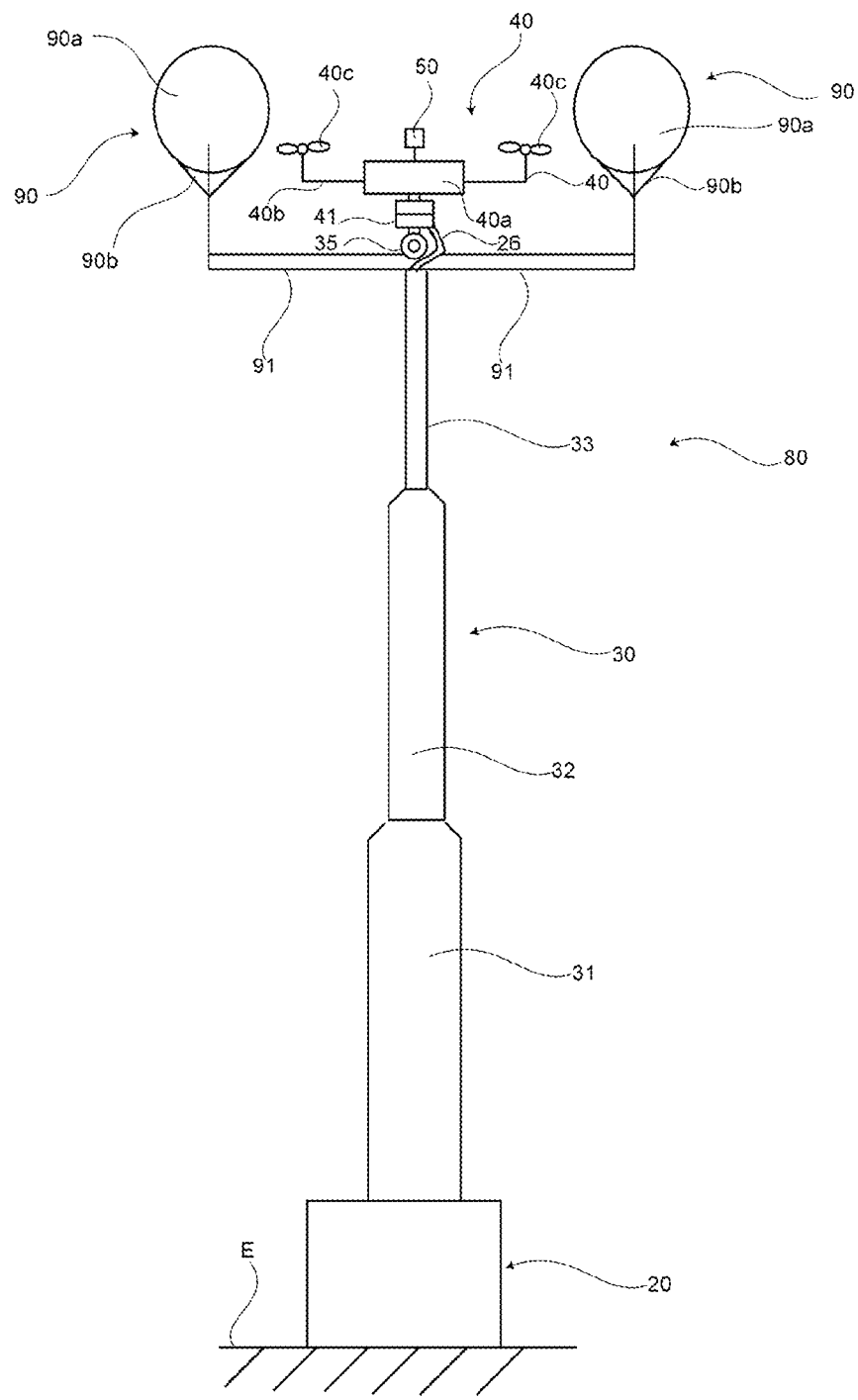
[FIG. 8]

HIGH-PLACE OBSERVATION DEVICE INCLUDING A GAS BALLOON AND A DETACHABLE ROTORCRAFT

CROSS-REFERENCE TO RELATED APPLICATION

The present application is a National Stage of International Application No. PCT/JP2017/025346, filed on Jul. 12, 2017, the disclosure of which is incorporated herein by reference in its entirety.

TECHNICAL FIELD

The present disclosure relates to a high-place observation device, and more particularly, to a high-place observation device for observing a high place using a long rod-shaped body or for performing an observation from a high place using a long rod-shaped body.

BACKGROUND ART

For example, when observing or investigating a high place such as a roof of a house or a ceiling of a tunnel, or observing a road from a high place to check the traffic condition of a road in a wide area, an observation device such as a camera or various sensors is attached to the top part of a long rod-shaped body, so that the imaging or observation of a high place, or the imaging or observation from a high place is performed.

Patent Document 1 discloses an observation device that performs imaging from a high place by using an extendable long-sized pole formed by combining a plurality of pole pieces having different diameters and mounting a camera at the top part of the pole, for the purpose of observing a target object.

According to the observation device of Patent Document 1, the pole can be extended depending on the height position of the target object to be observed, and the target object can be imaged from a high place via the camera mounted on the top part of the pole.

PRIOR ART

Patent Literature

Patent Document 1: Japanese Patent Publication No. 2017-67894 A

SUMMARY OF THE INVENTION

Technical Problem

According to the observation device of Patent Document 1, there are cases wherein depending on the height position of the target object to be imaged, the pole is required to be extended from the ground surface to a height position over a long length, such as several tens of meters, to image the target object.

Therefore, when an image is taken by extending the pole to such a height position, since the pole may bend and oscillate depending on the diameter of the pole, it is a concern that a target object cannot be stably observed at a fixed point. In particular, such a concern is obvious at several tens of meters up in the sky, since it is easy to be affected by gusts and air currents.

The present disclosure has been made in view of the above circumstances, and it is an object of the present disclosure to provide a high-place observation device capable of stably performing a fixed-point observation of a target object at a high place.

Technical Solution

In order to achieve the above object, a high-place observation device according to the present disclosure includes a long rod-shaped body formed to extend and contract freely which stands on an installation surface, a floating force generating means connected to the rod-shaped body for positioning the rod-shaped body to a desired height position by extending and contracting the rod-shaped body via a floating force in a connected state, a maintaining means for fixing and maintaining the height position of the rod-shaped body at the height position positioned via the floating force generating means, and an observation device attached to the floating force generating means.

According to this high-place observation device, the rod-shaped body is positioned at a desired height position by extending and contracting the rod-shaped body by the floating force generating means depending on the observation position of the target object. The height position of the rod-shaped body is fixed at this height position via the maintaining means.

As described above, since the height position of the rod-shaped body is fixed in a state where the rod-shaped body is positioned at the desired height, the rod-shaped body is suppressed from bending even if gusts or air currents act on the rod-shaped body. As a result, the rod-shaped body is suppressed from swinging. Therefore, it is possible to stably perform a fixed-point observation of a target object at a high place with an observation device.

According to this high-place observation device, the floating force generating means may be a rotorcraft that floats by rotating a plurality of rotary blades. If the floating force generating means is a rotorcraft, the rod-shaped body can be easily extended and contracted.

On the other hand, according to this high-place observation, the floating force generating means may be a gas balloon that floats via gas. If the floating force generating means is a gas balloon, the rod-shaped body can be extended and contracted with a simple configuration.

Further, the rotorcraft may be connected to the rod-shaped body so as to be always vertical to the installation surface. According to this, since the rotorcraft is connected to the rod-shaped body so that it always faces vertically to the installation surface, the target object can be observed stably at a substantially fixed point even if the rod-shaped body swings.

Meanwhile, the maintaining means may be a winding mechanism including a reel formed to rotate freely around an axis, and a wire which is released around the reel to be withdrawn from the reel with the extension of the rod-shaped body and wound around the reel to be withdrawn to the reel with the contraction of the rod-shaped body.

According to such a configuration, the height position of the rod-shaped body can be fixed by a winding mechanism having a simple configuration having a reel formed to rotate freely around an axis and a wire wound and released around the reel.

In addition, the winding mechanism may include a biasing means that constantly biases the reel in a direction in which the wire is wound around the reel. With this configuration, when the wire is wound around the reel, it is not necessary to perform the work of winding the wire on the reel, and the wire can be easily wound around the reel, so the contraction of the rod-shaped body is easily realized.

Meanwhile, the rod-shaped body may include an outer cylindrical body, and a plurality of inner cylindrical bodies whose diameters become gradually smaller than the outer cylindrical body, wherein each inner cylindrical body may be sequentially disposed inside the outer cylindrical body such that the diameter of each inner cylindrical body becomes gradually smaller and is formed in a hollow shape, and the wire of the winding mechanism may be a power supply line for supplying power to the rotorcraft and may be inserted through the rod-shaped body formed to have a hollow shape.

As described above, by adopting a configuration in which the wire is inserted into the hollow rod-shaped body, the rod-shaped body can be smoothly extended and contracted without bending.

In order to achieve the above object, a high-place observation device according to the present disclosure includes a long rod-shaped body formed to extend and contract freely which stands on an installation surface, a rotorcraft connected to the rod-shaped body for positioning the rod-shaped body to a desired height position by extending and contracting the rod-shaped body via a floating force generated by the rotation of a plurality of rotary blades in a connected state, a gas balloon connected to the rod-shaped body for positioning the rod-shaped body to a desired height position in collaboration with the rotorcraft, a maintaining means for fixing and maintaining the height position of the rod-shaped body at the height position set by the gas balloon and the rotorcraft, and an observation device attached to the rotorcraft, wherein the connection between the rod-shaped body and the rotorcraft may be released so that the rotorcraft is transitioned to a flying state.

According to this high-place observation device, the height position of the rod-shaped body is fixed by the maintaining means at the height position set by the rotorcraft and the gas balloon. In this case, when the connection between the rod-shaped body and the rotorcraft is released, transitioning the rotorcraft to a flying state is made possible.

Therefore, if the target object to be observed moves or travels, the rotorcraft can be transitioned to a flying state, and the movement or travel of the target object can be tracked.

At this time, since the rod-shaped body is fixed in a state where the height position thereof is positioned by the gas balloon, even if the connection between the rotorcraft and the rod-shaped body is released and the rotorcraft is transitioned to a flying state, the height position of the rod-shaped body is maintained.

After that, when the rotorcraft is reconnected to the rod, since observations can be made at the same height as before the rotorcraft was transitioned to the flying state, a fixed-point observation of a target object at a high place can be performed stably with an observation device.

Advantageous Effects

According to the present disclosure, a fixed-point observation of a target object at a high place can be performed stably.

BRIEF DESCRIPTION OF THE DRAWINGS

FIG. 1 is a diagram schematically illustrating a high-place observation device according to a first embodiment of the present disclosure.

FIG. 2 is, likewise, a diagram schematically illustrating a winding mechanism of the high-place observation device according to the present embodiment.

FIG. 3 is, likewise, a cross-sectional view of a rod-shaped body schematically illustrating the high-place observation device according to the present embodiment.

FIG. 5 is, likewise, a diagram schematically illustrating a connecting part between the rod-shaped body and the floating force generating means of the high-place observation device according to the present embodiment.

FIG. 7 is a diagram schematically illustrating a high-place observation device according to a second embodiment of the present disclosure.

FIG. 8 is a diagram schematically illustrating a high-place observation device according to a third embodiment of the present disclosure.

DETAILED DESCRIPTION OF THE INVENTION

Figure 4C:
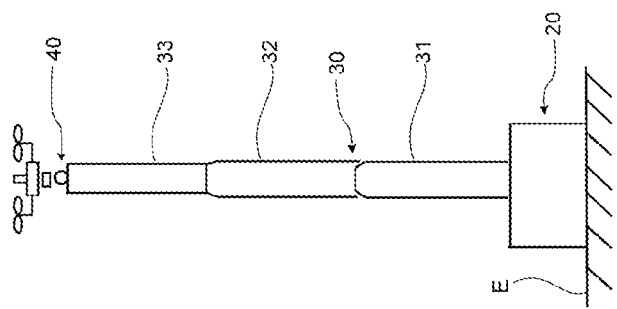
FIGS. 4(a) to 4(c) are, likewise, diagrams schematically illustrating a case where the rod-shaped body of the high-place observation device according to the present embodiment transitions from an accommodated state to an extended state.

Next, embodiments of the present disclosure will be described with reference to FIGS. 1 to 8.

First Embodiment (1) A first embodiment of the present disc will be described with reference to FIGS. 1 to 6(c).

FIG. 1 is a diagram schematically illustrating a high-place observation device according to the present embodiment, FIG. 2 is a diagram schematically illustrating a winding mechanism of the high-place observation device, and FIG. 3 is a cross-sectional view of a rod-shaped body schematically illustrating the high-place observation device.

As shown in the figures, the high-place observation device 10 includes a base 20 placed on the installation surface E, a pole 30 which is a long rod-shaped body supported by the base 20 which stands on the installation surface E, a rotorcraft 40 which is a floating force generating means connected to the pole 30, and a camera 50 which is an observation device attached to the rotorcraft 40, as main components.

The base 20 includes a housing 21 that is placed on the installation surface E and supports the pole 30, and a winding mechanism 22 which is a maintaining means accommodated in the housing 21.

The winding mechanism 22 includes a reel 23 formed to freely rotate around a rotating shaft 23a pivotally supported by the housing 21, a power supply line 26 as a wire wound around the reel 23 which supplies power to the rotorcraft 40 described below, and a locking mechanism 27 which regulates the rotation of the reel 23 and also releases the regulated rotation of the reel 23.

In the present embodiment, a boss part 24 having a smaller diameter than the reel 23 is formed on the reel 23, protruding from the reel 23 in the axial direction of the rotating shaft 23a. The boss part 24 incorporates a coil spring 24a, which is a biasing means that constantly biases the reel 23 in a direction in which the power supply line 26 wound around the reel 23.

A plurality of locking parts 25 are formed in the circumferential direction of the boss part 24. In the present embodiment, when the reel 23 rotates in the direction in which the power supply line 26 is wound around the reel 23, in the locking part 25, the front end side in the rotation direction of the reel 23 has a protruding part 25a which protrudes in the radial direction, and the rear end side in the rotation direction of the reel 23 has an inclined part 25b inclined so that the height of the protruding part 25a gradually decreases along the rotation direction.

The locking mechanism 27 includes a first link 27a pivotally supported by the housing 21, a second link 27b pivotally supported by a distal end of the first link 27a, and a roller 27c that is formed to rotate freely and is pivotally supported by a distal end of the second link 27b to contact the locking part 25 formed in the circumferential direction of the boss part 24.

In the winding mechanism 22 having such a configuration, when the reel 23 rotates in the direction of winding the power supply line 26 around the reel 23, the roller 27c rotates over the protruding part 25a of the locking part 25. When the reel 23 rotates in the direction of pulling the power supply line 26 from the reel 23, the roller 27c rotates over the inclined part 25b of the locking part 25.

Meanwhile, when the roller 27c is located between adjacent locking parts 25, that is, between the protruding part 25a of one locking part 25 and the inclined part 25b of another locking part 25, the pulling out or winding of the power supply line 26 on the reel 23 is not performed, and the rotation of the reel 23 is stopped.

In the present embodiment, the pole 30 has a long-sized rod shape, and includes an outer cylindrical body 31, a plurality of inner cylindrical bodies whose diameters become smaller than the outer cylindrical body 31, and in the present embodiment, a first inner cylindrical body 32, an outer cylindrical body 31, and a second inner cylindrical body 33 whose diameter is smaller than the first inner cylindrical body 32.

The outer cylindrical body 31 has a diameter having an arbitrary length α, and is a hollow cylindrical shape having a peripheral surface part 31a whose upper and lower parts are open, wherein an upper edge 31b is set at an upper open end edge and a lower edge 31c is set at a lower open end edge, and wherein a reduced diameter part 31d is formed between the peripheral surface part 31a and the upper edge 31b so as to incline and gradually reduce in diameter according to the transition from the peripheral surface part 31a to the upper edge 31b.

The first inner cylindrical body 32 has a diameter having an arbitrary length β smaller than the length α, and is a hollow cylindrical shape having a peripheral surface part 32a whose upper and lower parts are open, wherein an upper edge 32b is set at an upper open end edge and a lower edge 32c is set at a lower open end edge.

A reduced diameter part 32d is formed between the peripheral surface part 32a and the upper edge 32b of the first inner cylindrical body 32 so as to incline and gradually reduce in diameter as it moves from the peripheral surface part 32a to the upper edge 32b. An enlarged diameter part 32e is formed between the peripheral surface part 32a and the lower edge 32c so as to incline and gradually increase in diameter according to the transition from the peripheral surface part 32a to the lower edge 32c.

The second inner cylindrical body 33 has a diameter having an arbitrary length γ smaller than the length α and the length β, and is a hollow cylindrical shape having a peripheral surface part 33a whose upper and lower parts are open, wherein an upper edge 33b is set at an upper open end edge, and a lower edge 33c is set at a lower open end edge.

An enlarged diameter part 33d is formed between the peripheral surface part 33a and the lower edge 33c of the second inner cylindrical body 33 so as to incline and gradually expand in diameter according to the transition from the peripheral surface part 33a to the lower edge 33c.

A first inner cylindrical body 32 is inserted into the outer cylindrical body 31 from the lower edge 31c, and the first inner cylindrical body 32 is disposed inside the outer cylindrical body 31. The second inner cylindrical body 33 is inserted from the lower edge 32c of the first inner cylindrical body 32, and the second inner cylindrical body 33 is disposed inside the first inner cylindrical body 32 and inside the outer cylindrical body 31.

A small gap is interposed between the inner side of the outer cylindrical body 31 and the outer side of the first inner cylindrical body 32, and the first inner cylindrical body 32 is formed to be slidable with respect to the outer cylindrical body 31. Similarly, a small gap is also interposed between the inner side of the first inner cylindrical body 32 and the outer side of the second inner cylindrical body 33, and the second inner cylindrical body 33 is formed to be slidable with respect to the first inner cylindrical body 32.

In a state where the first inner cylindrical body 32 and the second inner cylindrical body 33 are disposed inside the outer cylindrical body 31, transitions are made between an accommodated state in which the first inner cylindrical body 32 is accommodated inside the outer cylindrical body 31 and the second inner cylindrical body 33 is accommodated inside the first inner cylindrical body 32, and an extended state in which the first inner cylindrical body 32 is pulled out from inside the outer cylindrical body 31 and the second inner cylindrical body is pulled out from inside the first inner cylindrical body 32, wherein a hollow pole 30 is formed to extend or contract freely.

In the present embodiment, the pole 30 transitions to the extended state, the enlarged diameter part 32e of the first inner cylindrical body 32 is engaged with the reduced diameter part 31d of the outer cylindrical body 31, and when the enlarged diameter part 33d of the second inner cylindrical body 33 is engaged with the reduced diameter part 32d of the first inner cylindrical body 32, the pole 30 is at its maximum length.

Such a pole 30 is attached to the base 20 at the lower edge 31c of the outer cylindrical body 31, supported by the base 20 via the base 20 and set on the installation surface E. Meanwhile, a cap 34 is mounted onto the upper edge 23b of the second inner cylindrical body 33 of the pole 30.

In the present embodiment, the cap 34 is formed with an insertion hole 34a through which the power supply line 26 is inserted, and the power supply line 26 which is wound around the reel 23 of the winding mechanism 22 and which is inserted into the hollow cylindrical pole 30 is inserted into the insertion hole 34a and exposed to the outside. The power supply line 26 is electrically connected to a rotorcraft 40 (described later) via a coupler 41 (described later) that connects the rotorcraft 40 to the pole 30.

Further, in the present embodiment, the cap 34 is provided with a gimbal 35 that supports the rotorcraft 40. The gimbal 35 is formed so as to be displaceable in two directions of the x-axis and the y-axis indicated by arrows in FIG. 3.

The rotorcraft 40 includes a main body part 40a which incorporates a control mechanism for controlling the rotorcraft 40, a plurality of arm parts 40b protruding and extending from the main body part 40a, and a plurality of rotary blades 40c provided on each arm part 40b as main components, which flies by a floating force (lift force) generated by the rotation of the plurality of rotary blades 40c, and is manipulated by a transmitter (not shown) operated by a pilot.

In the present embodiment, the rotorcraft 40 is connected to the gimbal 35 via the coupler 41. Thereby, the rotorcraft 40 is supported by the gimbal 35 and connected to the pole 30.

In the present embodiment, the connection between the rotorcraft 40 and the pole 30 via the coupler 41 is released by the manipulation of the transmitter. When the connection is released, it is possible to transition the rotorcraft 40 to a flying state to fly.

In the present embodiment, a camera 50 is attached to the main body part 40a of the rotorcraft 40. The camera 50 is controlled by a control mechanism (not shown) that controls a drive mechanism (not shown) that changes the direction of the camera 50. For example, the camera 50 is controlled to perform a pan operation of rotating the camera 50 left and right or a tilt operation of tilting the camera 50 up and down.

Figure 4B:
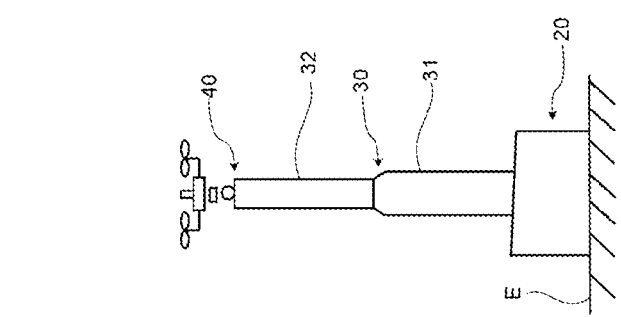
Figure 4A:
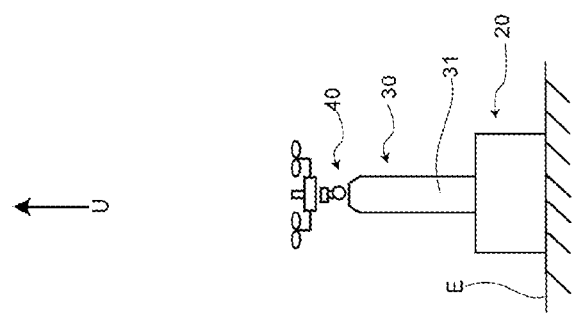

FIGS. 4(a) to 4(c) are diagrams schematically illustrating when the pole 30 transitions from the accommodated state to the extended state. As shown in FIG. 4(a), when the pole 30 is in an accommodated state, if the rotorcraft 40 rises in the ascending direction indicated by the arrow U via the rotation of the plurality of rotary blades 40c, the first inner cylindrical body 32 is gradually pulled out from inside the outer cylindrical body 31.

When the first inner cylindrical body 32 is pulled out and the rotorcraft 40 is transitioned to a hovering state in which the rotorcraft 40 stops its ascending at a height position where the enlarged diameter part 32e of the first inner cylindrical body 32 is engaged with the reduced diameter part 31d of the outer cylindrical body 31, as shown in FIG. 4(b), the pole 30 transitions to an extended state in which the first inner cylindrical body 32 is pulled out of the outer cylindrical body 31 and engaged (first extended state).

At this time, the power supply line 26 wound around the reel 23 is pulled out from the reel 23 following the floating of the rotorcraft 40, and when the rotorcraft 40 transitions to a hovering state, the roller 27c of the locking mechanism 27 provided by the winding mechanism 22 is disposed between the locking parts 25 and 25 which are adjacent to each other.

Thereby, since the rotation of the reel 23 is regulated, and the length of the power supply line 26 pulled out from the reel 23 is maintained, the height position of the pole 30 is fixed and maintained in the first extended state.

Meanwhile, when the pole 30 is in the first extended state, if the rotorcraft 40 further rises in the ascending direction U, the second inner cylindrical body 33 is gradually pulled out from the inside of the first inner cylindrical body 32.

When the second inner cylindrical body 33 is pulled out and the rotorcraft 40 is transitioned to a hovering state in which the rotorcraft 40 stops its ascending at a height position where the enlarged diameter part 33d of the second inner cylindrical body 33 is engaged with the reduced diameter part 32d of the first inner cylindrical body 32, as shown in FIG. 4(c), the pole 30 transitions to an extended state in which the second inner cylindrical body 33 is pulled out of the first inner cylindrical body 32 and the outer cylindrical body 31 and engaged (second extended state).

At this time, the power supply line 26 wound around the reel 23 is pulled out from the reel 23 following the floating of the rotorcraft 40, and when the rotorcraft 40 transitions to the hovering state, the roller 27c of the locking mechanism 27 provided by the winding mechanism 22 is disposed between the locking parts 25 and 25 which are adjacent to each other.

Thereby, since the rotation of the reel 23 is regulated, and the length of the power supply line 26 pulled out from the reel 23 is maintained, the height position of the pole 30 is fixed and maintained in the second extended state.

As described above, since it is possible to arbitrarily transition the height position of the pole 30 from the accommodated state of the pole 30 to the first extended state or the second extended state, the target object can be imaged by the camera 50 by transitioning to the first extended state or the second extended state depending on the observation position of the target object.

For example, when the high-place observation device 10 is disposed immediately below a bridge and a specific part at a high place of the bridge is observed, the pole 30 is transitioned to the first extended state or the second extended state depending on the height position of the specific part, and the specific part can be imaged by the camera 50.

Alternatively, in the case of observing a traffic situation on a road or customers at an event venue from high places, etc., the pole 30 is transitioned to the first extended state or the second extended state depending on the height position at which such a situation can be appropriately observed, and such a situation can be imaged by the camera 50.

FIG. 5 is a diagram schematically illustrating a connecting part between the pole 30 and the rotorcraft 40. As shown in the figure, for example, when the pole 30 swings in the horizontal direction indicated by the arrow H, the rotorcraft 40 is displaced in the direction of the x-axis via a gimbal 35 formed to be displaceable in two directions of the x-axis and the y-axis.

As described above, the rotorcraft 40 is connected to the pole 30 via the gimbal 35, and thus follows the swing of the pole 30 to be displaced in two axis directions so that the rotorcraft 40 is always vertically oriented with respect to the installation surface E.

Figure 6C:
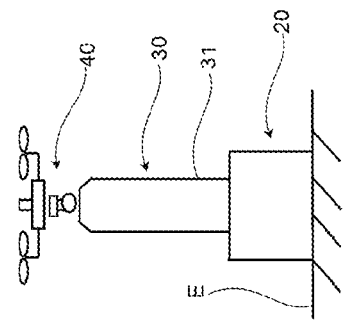
FIGS. 6(a) to 6(c) are, likewise, diagrams schematically illustrating a case where the rod-shaped body of the high-place observation according to the present embodiment transitions from the extended state to the accommodated state.
Figure 6B:
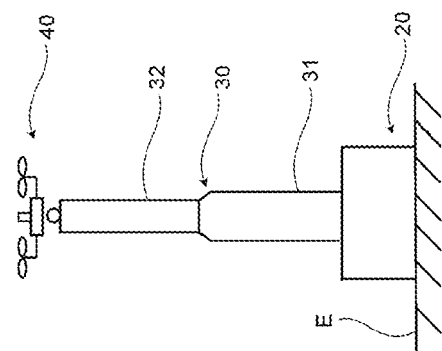
Figure 6A:
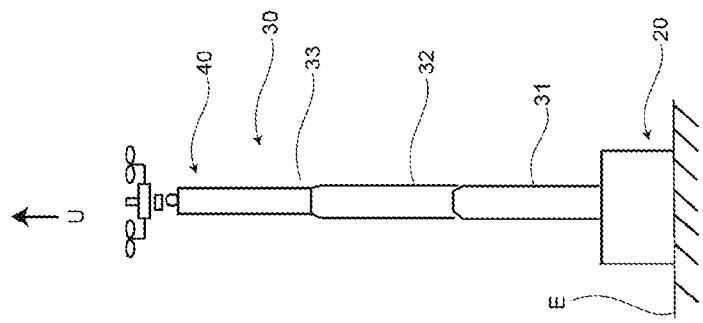

FIGS. 6(a) to 6(c) are diagrams schematically illustrating when the pole 30 transitions from the extended state to the accommodated state. As shown in FIG. 6(a), when the rotorcraft 40 slightly floats in the ascending direction U when the pole 30 is in the second extended state, the roller 27c of the locking mechanism 27 disposed between the adjacent locking parts 25 and 25 comes out from between the locking parts 25 and 25, and the regulation of the rotation of the reel 23 is released.

When the regulation of the rotation of the reel 23 is released, the power supply line 26 is wound around the reel 23 gradually by a coil spring 24a that biases the reel 23 in the direction in which the power supply line 26 is wound around the reel 23.

When the power supply line 26 is gradually wound around the reel 23, by having the rotorcraft 40 operated so as to be slightly lifted in the ascending direction U and a drag force is exerted against the biasing force of the coil spring 24a, the winding speed of the power supply line 26 can be adjusted.

When the power supply line 26 is wound up and the length of the power supply line 26 pulled out from the reel 23 becomes a length corresponding to the first extension state of the pole 30, the engagement between the enlarged diameter part 33d of the second inner cylindrical body 33 and the reduced diameter part 32d of the first inner cylindrical body 32 is released, and as shown in FIG. 6(b), the second inner cylindrical body 33 is accommodated inside the first inner cylindrical body 32.

At this time, when the rotorcraft 40 is operated so as to be lifted in the ascending direction U to exert a drag force against the biasing force of the coil spring 24a to stop the winding of the power supply line 26 by the reel 23, the roller 27c of the locking mechanism 27 is disposed between the locking parts 25 and 25, and the rotation of the reel 23 is regulated, so that the length of the power supply line 26 pulled out from the reel 23 is maintained.

Thereby, the pole 30 contracts from the second extended state and transitions to the first extended state, and the height position thereof is fixed and maintained in the first extended state.

Meanwhile, when the pole 30 is transitioned from the second extended state to the accommodated state, the power supply line 26 is wound around the reel 23 without regulating the rotation of the reel 23 in the first extended state.

When the power supply line 26 is wound up and the length of the power supply line 26 pulled out from the reel 23 becomes a length corresponding to the accommodated state of the pole 30, the engagement between the enlarged diameter part 32e of the first inner cylindrical body 32 and the reduced diameter part 31d of the outer cylindrical body 31 is released, as shown in FIG. 6(c), the second inner cylindrical body 33 and the first inner cylindrical body 32 are accommodated inside the outer cylindrical body 31.

As described above, since the height position of the pole 30 can be arbitrarily transitioned from the second extended state of the pole 30 to the first extended state or the accommodated state, when the observation position of the target object is changed, the target object can be followed or the observation can be stopped.

According to the high-place observation device 10 of the present embodiment, the pole 30 can be transitioned to the first extended state or the second extended state by the rotorcraft 40 depending on the observation position of the target object.

When the pole 30 is positioned in the first extended state or the second extended state, the length at which the power supply line 26 is pulled out from the reel 23 is maintained at this height position, and the height position of the pole 30 is fixed and maintained in the first extended state or the second extended state.

As described above, since the height position of the pole 30 is fixed in a state where the pole 30 is positioned at a desired height position such as the first extended state or the second extended state, the pole 30 is suppressed from bending even if gusts or air currents act on the pole 30. As a result, the pole 30 is suppressed from swinging. Therefore, it is possible to stably perform the fixed-point observation of the target object at a high place with a camera 30.

In particular, in the present embodiment, the extension and retraction of the pole 30 can be easily performed by the rotorcraft 40. In addition, since the rotorcraft 40 is displaced in two axial directions following the swing of the pole 30 so as to always face vertically to the installation surface E, even if the pole 30 swings, the target object can be observed stably at a substantially fixed point.

Further, in the present embodiment, by having a simple configuration of a winding mechanism 22 including a reel 23 formed to rotate freely around the rotating shaft 23a and a power supply line 26 that supplies power to the rotorcraft 40 which is wound around the reel 23, the length of the power supply line 26 pulled out from the reel 23 is maintained, and the height position of the pole 30 is fixed and maintained in the first extended state or the second extended state.

The reel 23 of the winding mechanism 22 is constantly biased in a direction in which the power supply line 26 is wound around the reel 23, by a coil spring 24a incorporated in the boss part 24 of the reel 23.

Therefore, when winding the power supply line 26 around the reel 23, there is no need to perform an operation of winding the power supply line 26 around the reel 23, and the winding of the power supply line 26 around the reel 23 is easy. Therefore, the accommodation of the first inner cylindrical body 32 and the second inner cylindrical body 33 inside the outer cylindrical body 31 of the pole 30 is easily realized.

In the present embodiment, since the power supply line 26 is inserted through the inside of the pole 30 formed in a hollow shape, the pole 30 can be smoothly extended and contracted without bending the pole 30.

2nd Embodiment

Next, a second embodiment of the present disclosure will be described with reference to FIG. 7.

In FIG. 7, the same components as those in FIGS. 1 to 6 are denoted by the same reference numerals, and a detailed description thereof will be omitted.

FIG. 7 is a diagram schematically illustrating a high-place observation device according to the second embodiment of the present disclosure. As shown in the figure, the high-place observation device 60 includes a base 20 placed on the installation surface E, a pole 30 which is a long rod-shaped body supported by the base 20 and set on the installation surface E, a gas balloon 70 which is a floating force generating means connected to the pole 30, and a camera 50 which is an observation device attached to the gas balloon 70, as main components.

In this embodiment, the gas balloon 70 includes an airbag 70a into which a gas such as helium or hydrogen is injected, and a shroud line 70b attached to the airbag 70a and connecting the airbag 70a to the pole 30, as main components, and floats via the gas injected into the airbag 70a.

When the pole 30 is transitioned from the accommodated state to the first extended state using the gas balloon 70, for example, gas required to extend the pole 30 to the first extended state may be injected into the airbag 70a.

Meanwhile, when transitioning the pole 30 from the accommodated state to the second extended state, gas required to extend the pole 30 to the second extended state may be injected into the airbag 70a.

On the other hand, when the pole 30 is contracted from the second extended state or the first extended state to the accommodated state, the reel 23 of the winding mechanism 22 may be manually rotated in the winding direction of the power supply line 26.

Meanwhile, if the gas gradually leaks from the airbag 70a, the floating force of the gas balloon 70 decreases, and so the pole 30 contracts gradually due to the biasing force for biasing the reel 23 of the winding mechanism 22 in the winding direction of the power supply line 26.

As described above, according to the high-place observation device 60 of the present embodiment, the pole 30 can be extended and contracted by the gas balloon 70 having a simple configuration.

Third Embodiment

Next, a third embodiment of the present disclosure will be described with reference to FIG. 8.

In FIG. 8, the same components as those in FIGS. 1 to 7 are denoted by the same reference numerals, and a detailed description thereof will be omitted.

FIG. 8 is a diagram schematically illustrating a high-place observation device according to the third embodiment of the present disclosure. As shown in the figure, the high-place observation device 80 includes a base 20 placed on the installation surface E, a pole 30 which is a long rod-shaped body supported by the base 20 and set on the installation surface E, a rotorcraft 40 connected to the pole, two gas balloons 90 and 90 connected to the pole 30 similarly to the rotorcraft 40, and a camera 50 which is an observation device attached to the rotorcraft 40, as main components.

In the present embodiment, the gas balloons 90 and 90 are provided on the connecting arms 91 and 91, which are provided on the cap 34 of the pole 30, protruding outside the pole 30.

The gas balloons 90 and 90 include an airbag 90a into which gas such as helium or hydrogen is injected, and a shroud line 90b mounted on the airbag 90a and connecting the airbag 90a to the connecting arms 91 and 91, as main components, and floats via the gas injected into the airbag 90a.

In the present embodiment, when the pole 30 is positioned in the first extended state or the second extended state by the rotorcraft 40, the gas balloons 90 and 90 position the pole 30 in cooperation with the rotorcraft 40 to the first extended state or the second extended state.

The pole 30 is positioned in the first extended state or the second extended state by the rotorcraft 40 and the gas balloons 90 and 90, and the winding mechanism 22 fixes the height position of the pole 30 at the set height position.

In this case, when the connection between the rotorcraft 40 and the pole 30 via the coupler 41 is released by the operation of the transmitter (not shown), it becomes possible for the rotorcraft 40 to transition from a hovering state to a flying state.

Therefore, if the target object of observation moves or travels, the rotorcraft 40 can be transitioned to the flying state, and the movement or travel of the target object can be tracked.

At this time, since the height of the pole 30 is fixed by the gas balloons 90 and 90, even when the connection between the rotorcraft 40 and the pole 30 is released and the rotorcraft 40 is transitioned to a flying state, the height position of the pole 30 is maintained.

The present disclosure is not limited to the above embodiments. It can be variously modified without departing from the spirit of the disclosure. In each of the above-described embodiments, the case where the reel 23 of the winding mechanism 22 includes the coil spring 24a that constantly biases the reel 23 in a direction in which the power supply line 26 is wound around the reel 23 has been described. However, when the power supply line 26 is wound around the reel 23, a motor that rotates the reel 23 in a direction in which the power supply line 26 is wound around the reel 23 may be disposed coaxially with the rotating shaft 23a of the reel 23.

In each of the above embodiments, when the pole 30 is extended from the accommodated state to the first extended state or the second extended state by the floating force of the rotorcraft 40 or the gas balloon 70 has been described. However, the extension of the pole 30 may be assisted by a gas cylinder or a cylinder using a coil spring.

In each of the above embodiments, when the height position is set so that the pole 30 transitions from the accommodated state to the first extended state or the second extended state has been described. However, a plurality of inner cylindrical bodies accommodated in the outer cylindrical body may be prepared, and a plurality of extended states may be further configured.

In the above embodiments, when the observation device is the camera 50 has been described, but various sensors according to the purpose of observation, such as a temperature sensor and an infrared sensor, may be used.

REFERENCE NUMERALS 10, 60, 80 high-place observation device
20 base
22 winding mechanism
23 reel
26 power supply line (wire)
30 pole (rod)
31 outer cylindrical body
32 first inner cylindrical body
33 second inner cylindrical body
35 gimbal
40 rotorcraft (floating force generating means)
50 camera (observation device)
70 gas balloon (floating force generating means)
90 gas balloon

The invention claimed is:

1. A high-place observation device comprising:
a base which stands on an installation surface;
a rod-shaped body formed to extend and contract freely and supported by the base;
a rotorcraft connected to the rod-shaped body for positioning the rod-shaped body to a desired height position by extending and contracting the rod-shaped body via a floating force generated by the rotation of a plurality of rotary blades in a connected state;
a coupler configured to couple the rotorcraft to the rod-shaped body and release the rotorcraft from the rod-shaped body;
a gas balloon connected to the rod-shaped body for positioning the rod-shaped body to a desired height position in collaboration with the rotorcraft;
a maintaining means for fixing and maintaining the height position of the rod-shaped body at the height position set via the gas balloon and the rotorcraft; and
an observation device attached to the rotorcraft,
wherein the maintaining means is a winding mechanism comprising:
a reel formed to rotate freely around an axis; and
a wire which is wound around the reel to be withdrawn from the reel with the extension of the rod-shaped body and wound around the reel with the contraction of the rod-shaped body.

2. The device of claim 1, wherein the winding mechanism comprises a biasing means that constantly biases the reel in a direction in which the wire is wound around the reel.

3. The device of claim 1, wherein the rod-shaped body comprises;
an outer cylindrical body; and
a plurality of inner cylindrical bodies whose diameters become gradually smaller than the outer cylindrical body,
wherein each inner cylindrical body is sequentially disposed inside the outer cylindrical body such that the diameter of each inner cylindrical body becomes gradually smaller and is formed in a hollow shape.

4. The device of claim 2, wherein the rod-shaped body comprises;

an outer cylindrical body; and
a plurality of inner cylindrical bodies whose diameters become gradually smaller than the outer cylindrical body,
wherein each inner cylindrical body is sequentially disposed inside the outer cylindrical body such that the diameter of each inner cylindrical body becomes gradually smaller and is formed in a hollow shape.

5. The device of claim 1, wherein a bottom portion of the rod-shaped body is coupled to the base.

* * * * *